April 26, 1966     A. S. WOLANIN     3,248,641
LOAD SHARING RESISTOR APPARATUS FOR A ROTATING
RECTIFIER DYNAMOELECTRIC MACHINE
Filed Nov. 1, 1962

WITNESSES
John L. Chopp
James F. Young

INVENTOR
Alexander S. Wolanin
BY Maury I. Hull
ATTORNEY

# United States Patent Office 3,248,641
Patented Apr. 26, 1966

3,248,641
LOAD SHARING RESISTOR APPARATUS FOR A ROTATING RECTIFIER DYNAMOELECTRIC MACHINE
Alexander S. Wolanin, Avonmore, Pa., assignor to Westinghouse Electric Corporation, Pittsburgh, Pa., a corporation of Pennsylvania
Filed Nov. 1, 1962, Ser. No. 234,825
2 Claims. (Cl. 322—95)

This invention relates to improvements in load sharing devices for use in parallel circuits, and more particularly to a load sharing and load equalizing resistor especially suitable for use in parallel rectifier circuits mounted upon a rotating shaft.

In recent years brushless dynamoelectric machines have come into use. In these machines, generally speaking, a winding or windings on the rotor member is disposed with respect to an energized stationary field winding so that a voltage is induced in the rotating winding as the shaft rotates. This voltage is rectified and applied as a direct current potential to an additional winding on the rotor to excite the additional winding. The additional winding may have other stationary windings inductively coupled thereto for various uses. Such a brushless device requires that the rectifiers be mounted upon and rotate with the rotating shaft. One such rotating rectifier device or arrangement is shown and described in Patent No. 2,972,711 to V. G. Sorokin and A. S. Wolanin, issued February 21, 1961, for "Rotating Rectifier," and assigned to the assignee of the instant invention.

Frequently the electrical circuit interconnecting the various windings and rectifiers on the armature includes a considerable number of parallel current paths, and in such circumstances it is desirable that the load current be equalized between the various branches of the circuit. In prior art devices for obtaining equal current division among parallel branches of a rotating rectifier exciter, in normal application of silicon diodes operating in a number of such parallel branches, small "C" core reactors have been used around the leads of the diode branches to force equal load sharing among the parallel branches. However, on the rotating rectifier exciter the mounting of such small "C" core reactors becomes a serious problem since the equipment in some cases must rotate at 3600 revolutions per minute.

The apparatus of the instant invention overcomes the disadvantage of the prior art by utilizing a resistor in series with each diode leg to increase the voltage drop between circuit points of paralleling. In effect each diode leg then has a more equal drooping regulation or characteristic which forces all parallel paths to share the load equally, thus avoiding overloading any single branch.

In summary, the apparatus of the invention employs a plurality of generally rectangular U-shaped radially projecting resistors at spaced intervals around the periphery of the shaft and insulated therefrom while being secured against movement relative to the shaft. The curved portion of the "U" is at the end of the resistor away from the shaft. Heat generated in the resistor does not get to the shaft. With shafts rotating at such speeds as are in use in the present state of the art, the slightest deflection of the shaft cannot be tolerated. The resistors are air cooled by the rotation of the shaft and may be easily adjusted in resistance value by trimming the outer end or sides of the resistor element which are exposed to the air. These U-shaped resistors are bare, and as previously stated act as a blower to be self-cooling. The ends are bolted or brazed to the main copper leads which are appropriately banded to withstand rotational forces.

Accordingly, a primary object of the invention is to provide a new and improved load sharing device for use in a parallel circuit.

Another object is to provide new and improved load sharing apparatus for use with rotating rectifier equipment.

Another object is to provide new and improved load sharing resistors for use on rotating shafts in parallel circuits.

These and other objects and advantages will become more clearly apparent after a study of the following specification, when read in connection with the accompanying drawings, in which.

Figure 1A:
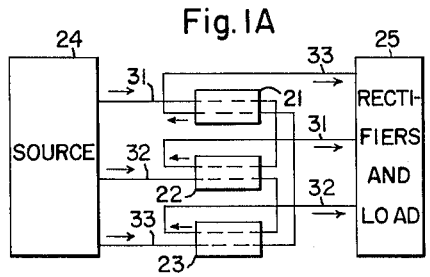
FIGURES 1A, 1B and 1C show typical "C" core reactors and the electrical connections thereto according to the prior art.
Figure 1B:
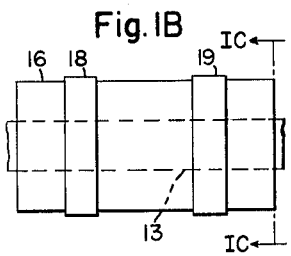
Figure 1C:
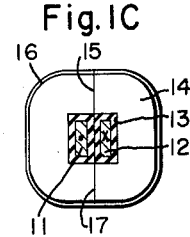

Referring now to the drawings, in which like reference characters are used throughout to designate like parts, for a more detailed understanding of the invention, and in particular to FIG. 1C thereof, there is shown an end view of a "C" core reactor having a pair of insulated leads 11 and 12 passing through a central aperture 13 in a plurality of turns of laminated magnetic steel, one of these turns being shown at 14 and having the breaks 15 and 17 therein. The entire "C" core assembly is held together as by banding 16. In FIG. 1B a side-elevational view of the device of FIG. 1C is shown, the "C" core device having retaining means 18 and 19.

The "C" core reactor may be formed by winding a solenoid-like member from laminated steel material upon a square frame corresponding to the dimensions of the two insulated leads which will pass through the finished reactor. The solenoid of laminated steel is split on both sides (approximately 180 degrees apart) to form a split core. The two core halves are then slipped around the two leads, and the core halves closely and securely bound together, so that there is no air gap in the core at either break 15 or break 17.

The operation of the "C" core reactor of FIG. 1C depends upon the fact that the currents in the two leads 11 and 12 are flowing in opposite directions. Current in either one of these conductors would tend to set up a magnetic field by induction in the laminated steel windings around the two conductors. When the currents in leads 11 and 12 are equal, the fields oppose each other and substantially no resultant field is produced in the laminated steel windings 14. When however the current in lead 11 exceeds the current in lead 12, a field is set up in 14 in a direction which tends to oppose the flow of current in lead 11 and to aid the flow of current in the opposite direction in lead 12, thereby tending to equalize the currents in the two leads and maintain them at the same value. Should the current in lead 12 exceed that in lead 11, a field is set up in 14 in a direction to oppose the current in lead 12 and aid the current in lead 11.

Particular reference is made to FIG. 1A which shows how three "C" core reactors 21, 22 and 23 are connected between a source of potential in parallel paths to apparatus shown in block form, which it is understood includes a rectifier in series in each of the leads 33, 31 and 32 and a useful load of some kind. The source of potential 24 may include a plurality of parallel windings on the rotor of a rotating armature device, and the output leads 31, 32, and 33, it is understood, are parallel paths through "C" core reactors 21, 22 and 23, each of the leads 31, 32 and 33 having one or more rectifiers connected in series therein to supply potential to the useful load 25 which may be a direct current energized winding on the rotor. From FIG. 1A it is seen that leads 31 and 33 pass in opposite directions with respect to current flow through the "C" core reactor 21; leads 31 and 32 pass in opposite directions with respect to current flow through the "C" core reactor 22, and leads 33 and 32 pass in opposite directions with respect to current flow through the "C" core reactor 23. The wiring arrangement of the "C" core reactors as seen in FIG. 1A necessitates a complicated wiring assembly with crossing leads, which is difficult to provide on a rotating shaft, and which requires precautions to prevent the leads from overheating or loosening as a result of shaft rotation.

Figure 2:
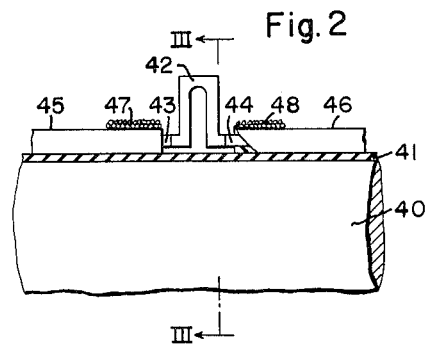
FIG. 2 is a side-elevational view of the resistor of the invention mounted upon a rotatable shaft.

Particular reference is made now to FIG. 2, where a load sharing resistor in accordance with the invention is shown. The shaft 40 has a layer of insulation 41 extending therearound upon which is disposed the U-shaped resistor 42 which may be formed integrally with, or welded or otherwise secured to, leads 43 and 44, having insulation 45 and 46, respectively with the banding 47 and 48 respectively for securely fastening the leads and resistor in place on the shaft.

Figure 3:
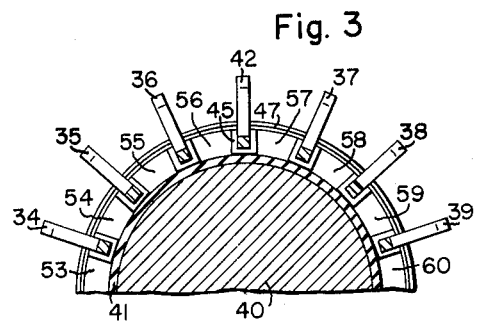
FIG. 3 is a cross-sectional view through the shaft of FIG. 2 along the line III—III, showing a number of mounted resistors spaced around the periphery of the shaft.

Particular reference is made now to FIG. 3 where a plurality of other resistors similar to resistor 42 are shown, being designated 34, 35, 36, 37, 38 and 39. Spacers may be used between the leads if desired for positioning them at spaced intervals around the periphery of the shaft, these spacers being designated 53, 54, 55, 56, 57, 58, 59 and 60. The spacers may be omitted if they are not required.

Figure 4:
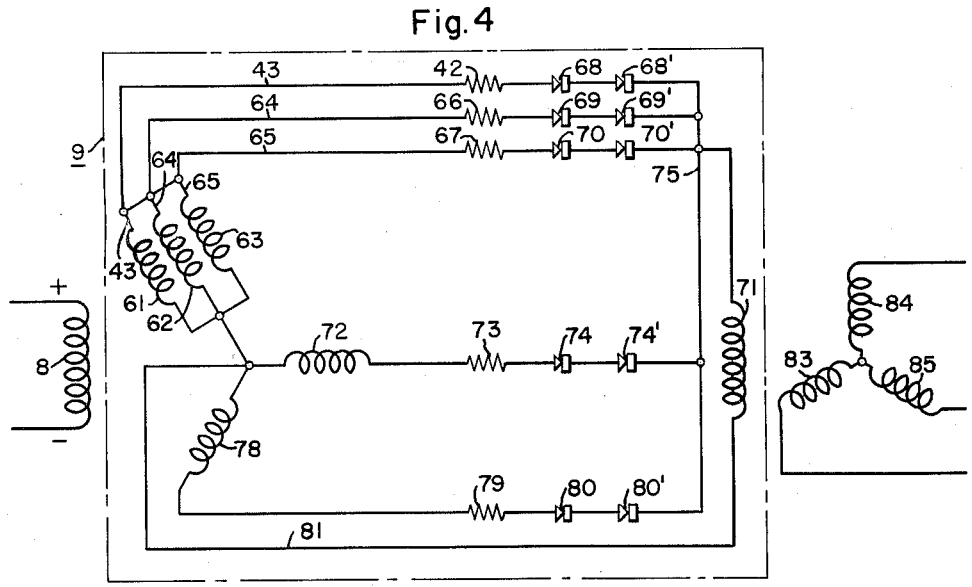
FIG. 4 is an electrical schematic circuit diagram showing resistors of FIGS. 2 and 3 connected in circuit with rectifiers, a source and a load.

Particular reference is made now to FIG. 4, where the resistors of FIGS. 2 and 3 are shown connected in aforementioned parallel circuits of a rotating rectifier machine. The rotating portion of the electrical circuits is enclosed as at 9. A direct current excited stationary field winding 8 is coupled to a Y-connected three phase exciter armature, and whereas only three parallel windings 61, 62 and 63 are shown for convenience of illustration in one leg of the three phase exciter armature, it will be understood that this leg of the circuit may include any desired number of paralleled windings, for example 10, and that the other legs may include the same number. The windings 61, 62 and 63 are connected together to a common circuit point by leads 43, 64 and 65, and are thence connected to load sharing resistors 42, 66 and 67 and thence to rectifiers 68, 69 and 70 respectively which may include any desired number of series-connected rectifiers illustrated by 68', 69' and 70', and thence by way of lead 75 to the load 71, which in the illustration is the field winding of the three phase generator having stationary windings 83, 84 and 85. Another branch of the three phase exciter armature is symbolized by the coil 72 which it is understood may comprise a plurality of parallel windings, for example 10. Winding 72 is connected by way of resistor 73 and rectifiers 74 and 74' to the load or field winding 71. The third branch of the exciter armature is symbolized by coil 78 which may be a plurality of paralleled coils, connected by way of resistor 79 and rectifiers 80 and 80' to the load or field winding 71. Lead 81 may provide a common return. It will be understood that each of the phase windings 72 and 78 is connected to a plurality of parallel rectifier circuits, as specifically illustrated for the first phase, and that each phase may have any necessary number of parallel rectifier circuits.

In the circuit of FIG. 4, the resistor added in series with each rectifier results in branches in each of which there are two impedances in series; by making the impedance of the rectifier only part of a total larger impedance, it will be readily seen that variations in the resistances of the rectifiers will have less effect on the branch current than if the rectifier comprised substantially the entire impedance of any particular branch of the circuit.

In effect, the added resistance results in a curve of branch current plotted along the abscissa against voltage plotted along the ordinate of a coordinate system in which the curve is steeper or more nearly vertical for any branch, and slight differences in rectifier impedances between any two branches result in less current difference between the two branches.

As previously stated the U-shaped resistor 42 and the other U-shaped resistors projecting radially away from the shaft are self cooled by the blower effect of rotation of the shaft. The ends of the resistor may be bolted or brazed to the main copper leads and as shown appropriately banded to withstand rotational forces. If desired banding in addition to banding 47 and 48 may be used.

The resistors of FIG. 2 an FIG. 3 make for simplicity of wiring, since leads may run directly from an exciter or other source to a load spaced therefrom any suitable distance on the shaft, and no cross-connections or complicated wiring arrangement is required.

At the time the machine is assembled the value of the resistor 42 may be altered within small limits or within a small range by clipping material from the resistor, or adding material to the resistor, as by soldering or welding, to permit a precise adjustment of the resistor value and a precise balancing of the current between the branches of the parallel circuits.

There has been provided then apparatus well suited to accomplish the aforedescribed objects of the invention which are to provide load sharing apparatus in which complicated wiring is not required, in which the load sharing devices are cooled by air as the shaft rotates, in which the load sharing devices are easily mounted on the shaft, and in which the resistance value and accordingly the effect of each load sharing device may be easily adjusted for precise balancing of the currents in the system.

Sleeve 41 may provide thermal insulation as well as electrical insulation.

In place of the circuit arrangement of FIG. 4, a full wave rectifier circuit may be employed. The armature windings may be delta connected if desired.

Whereas the invention has been shown and described with respect to an exemplary embodiment thereof which gives satisfactory results, it should be understood that changes may be made and equivalents substituted without departing from the spirit and scope of the invention.

I claim as my invention:

1. In a dynamoelectric machine having a rotatable shaft, winding means on the shaft having a voltage induced therein as the shaft rotates, and load means on the shaft for utilizing the voltage induced in the winding means, in combination, means forming a plurality of parallel electrical paths connecting the winding means to the load means, each of said paths including in series at least one resistor and at least one rectifier, all of said rectifiers being similar and all of said resistors normally having similar resistance values, the resistors being mounted at spaced intervals around the periphery of the shaft and insulated therefrom, said resistors being U-shaped with the bottom portion of the "U" at the ends of the resistors remote from the shaft, said resistors being cooled by air circulated thereover as the shaft rotates, and means for securely binding the resistors in position on the shaft, the resistors tending to equalize the currents through the rectifiers of said plurality of parallel paths.

2. In dynamoelectric apparatus, in combination, a rotatable shaft, winding means mounted on said shaft for rotation therewith and adapted to have a voltage induced therein as the shaft rotates, load means mounted on said shaft and adapted to be energized from the winding means, and circuit means forming a plurality of parallel current paths connecting the winding means to the load means, each of said parallel paths including in series a resistor and at least one rectifier, all of said rectifiers being similar and all of said resistors normally having similar resistance values, said plurality of resistors being mounted at spaced intervals around the periphery of the shaft, at least a portion of each of said resistors being spaced from the shaft and being cooled by air as the shaft rotates, said resistors being U-shaped and extending radially from the shaft, means for insulating the resistors from the shaft, and means for securing the resistors to the shaft, said resistors tending to equalize the currents through the respective rectifiers of the parallel paths.

References Cited by the Examiner

UNITED STATES PATENTS

| | | | |
|---|---|---|---|
| 2,451,241 | 10/1948 | Rosentreter | 338—51 |
| 2,910,600 | 10/1959 | Young | 310—72 |
| 3,018,380 | 1/1962 | Bright | 321—27 |
| 3,030,531 | 4/1962 | Lessmann. | |

MILTON O. HIRSHFIELD, *Primary Examiner.*

LLOYD McCOLLUM, *Examiner.*